US012341915B2

(12) United States Patent
Raj et al.

(10) Patent No.: US 12,341,915 B2
(45) Date of Patent: Jun. 24, 2025

(54) SYSTEM AND METHOD FOR WRITING AND RETRIEVAL OF DATA IN A DISTRIBUTED LEDGER

(71) Applicant: Siemens Aktiengesellschaft, Munich (DE)

(72) Inventors: Arun Raj, Tamil Nadu (IN); Saurabh Narayan Singh, Bayern (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 260 days.

(21) Appl. No.: 18/068,573

(22) Filed: Dec. 20, 2022

(65) Prior Publication Data

US 2023/0208660 A1    Jun. 29, 2023

(30) Foreign Application Priority Data

Dec. 23, 2021   (EP) .................................... 21217483

(51) Int. Cl.
*H04L 9/00* (2022.01)
*H04L 9/32* (2006.01)

(52) U.S. Cl.
CPC .............. *H04L 9/50* (2022.05); *H04L 9/3236* (2013.01)

(58) Field of Classification Search
CPC ......... H04L 9/50; H04L 9/3236; G06F 16/23; G06F 16/9024; G06F 16/28
See application file for complete search history.

(56) References Cited

U.S. PATENT DOCUMENTS

| | | | |
|---|---|---|---|
| 2017/0178237 A1* | 6/2017 | Wong ................... | G06Q 20/381 |
| 2018/0276666 A1* | 9/2018 | Haldenby ............. | H04L 9/3268 |
| 2020/0272981 A1* | 8/2020 | Kirkegaard ......... | H04L 63/0428 |

(Continued)

FOREIGN PATENT DOCUMENTS

EP    3499789 A1    6/2019

OTHER PUBLICATIONS

Anonymous: ; Blockchain; Aug. 3, 2021; pp. 1-33; XP093169776, Wikipedia, Retrieved from the Internet on Mar. 6, 2024, The Wayback Machine, https:// web.archive.org/web/20210803183605/ https://en.wikipedia.

(Continued)

*Primary Examiner* — Mohammad W Reza
(74) *Attorney, Agent, or Firm* — Schmeiser, Olsen & Watts LLP

(57) ABSTRACT

A system and a method for writing and retrieval of data in a distributed ledger is provided and includes receiving a first dataset including data entries between a start instant and an end instant of a current regular time interval from nodes that are online and recording in a current main block; and receiving one or more second datasets including data entries between respective start instants, preceding the current regular time interval, and respective end instants of corresponding one or more given regular time intervals, from nodes that were offline at the respective end instants of the corresponding one or more given regular time intervals and are online then and recording in corresponding one or more current temporal side blocks; and pegging the temporal side blocks to the main block, and committing to the distributed ledger.

11 Claims, 4 Drawing Sheets

(56) References Cited

U.S. PATENT DOCUMENTS

2022/0284423 A1* 9/2022 Kedy ................. H04L 41/0866

OTHER PUBLICATIONS

ETSI, "PDL Operations in Offline Mode"; retrieved from Internet: URL:https://ww.etsi.org/deliver/etsi_gr/PDL/001_099/010/01.01.01_60/gr_PDL010v010101p.pdf; 2021.
Back, Adam et al.: "Enabling Blockchain Innovations with Pegged Sidechains"; retrieved from Internet: URL:https://blockstream.com/sidechains.pdf; 2014; XP055850070; Oct. 22, 2014.

* cited by examiner

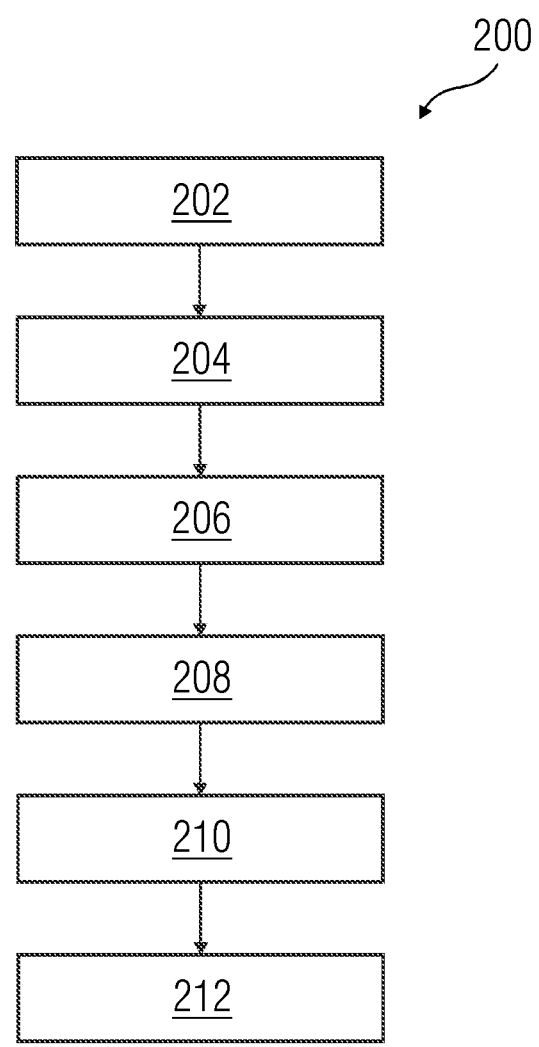

SYSTEM AND METHOD FOR WRITING AND RETRIEVAL OF DATA IN A DISTRIBUTED LEDGER

CROSS-REFERENCE TO RELATED APPLICATIONS

This application claims priority to EP Application No. 21217483.3, having a filing date of Dec. 23, 2021, the entire contents of which are hereby incorporated by reference.

FIELD OF TECHNOLOGY

The following generally relates to a distributed ledger, and more particularly to a method and a system for writing and retrieval of data in a distributed ledger for an internet-of-things environment.

BACKGROUND

Distributed ledgers, such as Blockchain, offer increased security against manipulation of data. Blockchain is a chronological database as it records data in form of chained or ordered blocks and each block corresponds to the data or transactions in a specific logical or real time epoch. For example, if a block is produced every 10 minutes and the genesis block was created at 1 am, the second block will depict the time 1:00-1:10, and so on. Though there might be minor variations, this holds true. However, in an ever-growing blockchain, with time-mapped transactions and challenges like data synchronisation, double spend and so on, it has been a challenge to make sure that transactions are always processed in a correct order. These challenges have led to strict blockchain designs which reject transactions coming later, or from offline nodes and there is no way to support transactions made by offline nodes unless they come online and propose new transactions. That is, if all the nodes are online, this data is recorded in a timely manner; however, if one or more of the nodes are offline, they will not be able to interact with the main blockchain and the data can only be recorded in the main blockchain after those nodes come back online.

However, adopting the above given approach disrupts the temporal order. For example, considering a monitoring framework wherein the parameters (like temperature, pressure, etc.) from Internet-of-Things (IoT) devices, such as sensors, are periodically recorded on the blockchain, which might be implemented for critical applications like power plants; and, in such implementations, the data needs to be organized properly. If, due to hardware or other failure, few nodes go down and some IoT devices are unable to record the information, the blockchain will proceed with only the data from other devices. Hence, it might result in a block generated at say, 2 am, which has timely data from 20 IoT sensors instead of the expected 30. If these 10 sensors come back online at 2:15 AM, the block generated at 2:20 will have data for 2:10-2:20 for 20 sensors and 2:00-2:20 for 10 sensors, which breaks the uniformity of the data. Later, if someone queries for the data at 2:00 AM for all the sensors, it may not be possible to fetch all the blocks at 2:10 am and provide a response, as some data might have been recorded a bit late. This breaks the concept of temporal ordering of data and reduces efficiency.

This limitation of the current blockchain technologies is a strict security promising approach. However, without supporting offline nodes and their transactions, blockchain frameworks are not able to incorporate use cases with IoT devices which have limited network connectivity, for example, UAVs (unmanned autonomous vehicles), cold chains (measuring and storing temperature of food/medicines while transportation), and many other edge devices related potential blockchain use cases. Currently, there are no blockchain frameworks which handle this issue. Since this is by design that the transactions proposed by the offline nodes are discarded by the consortia at a protocol level, there is not much that can be done. Some software architecture solutions exist, like creating a queue of transactions before feeding them to the blockchain, and in case a transaction is denied, putting it back in the queue and requesting again. Although these methods solve some parts of the challenge, there are multiple edge cases that these must be designed around.

SUMMARY

An aspect relates to a distributed ledger which allows for recording datasets from offline nodes to be written therein and later retrieved therefrom.

It may be appreciated that even though the described strict implementation might even be a necessity in cryptocurrency blockchains like Bitcoin, this is not necessarily the case with enterprise blockchain frameworks. In enterprise use cases, the data stored in blockchain can be out of order based on use case; for example, an IoT (Internet of Things) node storing time-series data stream on the blockchain. More importantly, this is a non-functional requirement in many cases that the data could be added to the chain even if a node goes offline for some time. At the very least, the proposed transactions should be evaluated by the consortia before rejecting the transactions coming from an offline node. Furthermore, even in cryptocurrency based blockchains, like Bitcoin, not all transactions coming from an offline node need to be discarded. For instance, a case where one user transfers some bitcoins to another user and no further transactions happen, even if the node goes down, and the chain moves forward, these transactions could be added to the main chain after the node comes up again, since this is not a double spend scenario. But in the conventional approach, the offline node would be considered a soft-fork and all the transactions will be reverted and cancelled.

The aspect of the present disclosure is achieved by a method for writing and retrieval of data in a distributed ledger adapted to commit blocks therein at regular time intervals. The method comprises receiving a first dataset comprising data entries between a start instant of a current regular time interval and an end instant of the current regular time interval, from nodes that are online at the end instant of the current regular time interval. The method further comprises recording the received first dataset in a current main block. The method further comprises receiving one or more second datasets comprising data entries between respective start instants of corresponding one or more given regular time intervals, preceding the current regular time interval, and respective end instants of the corresponding one or more given regular time intervals, from nodes that were offline at the respective end instants of the corresponding one or more given regular time intervals and are online at the end instant of the current regular time interval. The method further comprises recording each of the received one or more second datasets in corresponding one or more current temporal side blocks. The method further comprises pegging the one or more current temporal side blocks to the current main block. The method further comprises committing the current main block to the distributed ledger. This improves fault tolerance of the blockchain applications, and allows addition of data even if a node has been offline for certain time or blocks, and thus enables better performance of the IoT Blockchain use cases by handling transactions created during poor network connection.

In one or more embodiments, committing the current main block to the distributed ledger comprises creating a first link connecting the current main block to a previously committed main block in a main chain of the distributed ledger.

In one or more embodiments, pegging the one or more current temporal side blocks to the current main block comprises creating a second link connecting the current main block to a last one of the one or more current temporal side blocks; and creating a third link connecting first one of the one or more current temporal side blocks to one of the main blocks corresponding to a given regular time interval preceding another given regular time interval corresponding to the first one of the one or more current temporal side blocks.

In one or more embodiments, the method further comprises creating one or more fourth links, with each of the one or more fourth links connecting one of committed main block in the main chain of the distributed ledger if available to one of the temporal side blocks corresponding to a given regular time interval preceding another given regular time interval corresponding to the one of the committed main block.

In one or more embodiments, retrieving data associated with a particular regular time interval from the distributed ledger comprises reading data entries from the committed main block in the main chain corresponding to the particular regular time and data entries from a temporal side block pegged to another committed main block next to the committed main block in the main chain.

In one or more embodiments, the method further comprises discarding data entries associated with one of the given regular time intervals from the one or more second datasets conflicting with data entries recorded in one of the main blocks corresponding to the one of the given regular time interval and committed to the distributed ledger.

The aspect of the present disclosure is also achieved by a system for writing and retrieval of data in a distributed ledger adapted to commit blocks therein at regular time intervals. The system comprises one or more processing units, and a memory communicatively coupled to the one or more processing units, the memory comprising a module stored in the form of machine-readable instructions executable by the one or more processing units, wherein the module is configured to perform the method steps described above.

In one or more embodiments, the distributed ledger is implemented in an internet-of-things environment.

The aspect of the present disclosure is further achieved by a computer-program product, having computer-readable instructions stored therein, that when executed by a processing unit, cause the processing unit to perform the method steps described above.

The aspect of the present disclosure is further achieved by a computer readable medium on which program code sections of a computer program are saved, the program code sections being loadable into and/or executable in a system to make the system execute the method steps described above when the program code sections are executed in the system.

Still other aspects, features, and advantages of embodiments of the invention are readily apparent from the following detailed description, simply by illustrating a number of particular embodiments and implementations, including the best mode contemplated for carrying out embodiments of the invention. Embodiments of the invention are also capable of other and different embodiments, and its several details can be modified in various obvious respects, all without departing from the scope of embodiments of the invention. Accordingly, the drawings and description are to be regarded as illustrative in nature, and not as restrictive.

As used herein, the term "blockchain" or "blockchain network" may refer to a decentralized network that includes the plurality of nodes. In an example, the blockchain network is a consortium blockchain network. Such plurality of nodes may, for example, perform transactions in the blockchain network.

As used herein, the term "computing device" may refer to be a physical, a virtual device or a computer-program product. In many implementations, the computing device may be any device capable of performing operations, such as a dedicated processor, a portion of a processor, a virtual processor, a portion of a virtual processor, portion of a virtual device, or a virtual device. The system of the present disclosure may include or be embodied in the computing device. In some implementations, the computing device may execute an application for decentralized auditing of the blockchain network.

As used herein, the term "distributed ledger" may refer to utilized by the blockchain network to store the performed transactions. An access to information of the transaction in the ledger is provided to designated nodes of the blockchain network that are a part of the transaction.

As used herein, the term "network" may be utilized for communication of the blockchain network, the computing device and the ledger. In other words, the blockchain network, the computing device and the ledger are communicatively coupled via the network.

BRIEF DESCRIPTION

Some of the embodiments will be described in detail, with reference to the following figures, wherein like designations denote like members, wherein:

FIG. 2 is a flowchart representation of a method listing steps involved in writing and retrieval of data in the distributed ledger, in accordance with an embodiment of the present disclosure;

DETAILED DESCRIPTION

Figure 1:
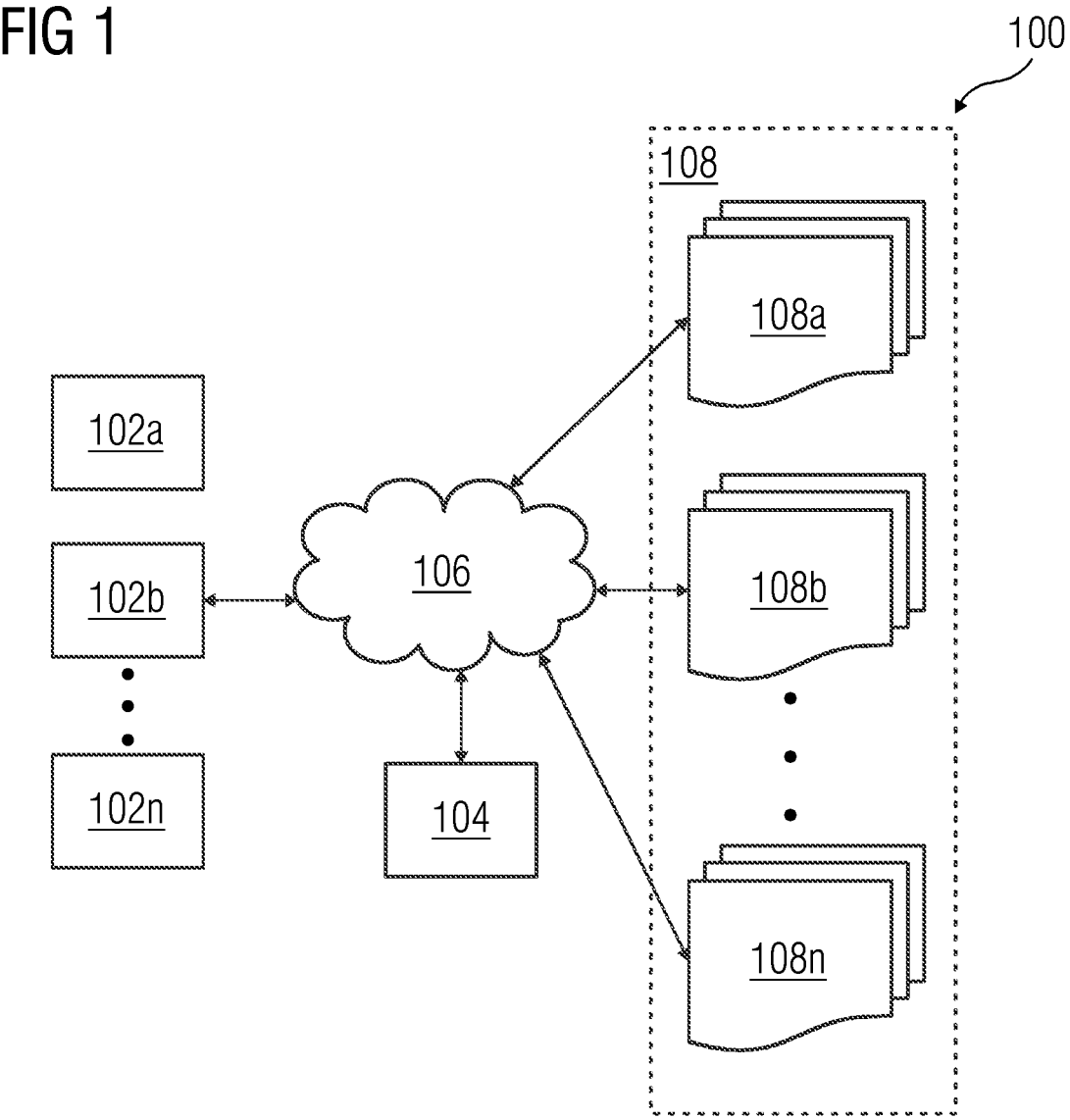
FIG. 1 is a schematic diagram representation of an internet-of-things environment implementing a distributed ledger for writing and retrieval of data therein, in accordance with an embodiment of the present disclosure.

Examples of a method, a system, a computer-program product and a computer readable medium for writing and retrieval of data in a distributed ledger are disclosed herein. Various embodiments are described with reference to the drawings, wherein like reference numerals are used to refer to like elements throughout. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Unless specified otherwise in the following description, the terms "perform", "calculate", "computer-assisted", "compute", "establish", "generate", "configure", "reconstruct", and the like relate to operations and/or processes and/or processing steps that change and/or generate data and/or convert the data into other data, wherein the data may be represented or be present in particular in the form of physical variables, for example in the form of electrical impulses. The expression "computer" should in particular be interpreted as broadly as possible in order in particular to cover all electronic devices having data processing properties. Computers may thus for example be personal computers, servers, programmable logic controllers (PLCs), handheld computer systems, pocket PC devices, mobile radio devices and other communication devices able to process data in a computer-assisted manner, processors and other electronic data processing devices.

Moreover, in particular a (relevant) person skilled in the art, with knowledge of the method claim/method claims, is of course aware of all routine possibilities for realizing products or possibilities for implementation in the conventional art, and so there is no need in particular for independent disclosure in the description. In particular, these customary realization variants known to the person skilled in the art can be realized exclusively by hardware (components) or exclusively by software (components). Alternatively, and/or additionally, the person skilled in the art, within the scope of his/her expert ability, can choose to the greatest possible extent arbitrary combinations according to embodiments of the invention for hardware (components) and software (components) in order to implement realization variants according to embodiments of the invention.

A combination according to embodiments of the invention for hardware (components) and software (components) can occur in particular if one portion of the effects according to embodiments of the invention is brought about exclusively by special hardware (e.g., a processor in the form of an ASIC or FPGA) and/or another portion by the (processor- and/or memory-aided) software.

In particular, in view of the high number of different realization possibilities, it is impossible and also not helpful or necessary for the understanding of embodiments of the invention to name all these realization possibilities. In this respect, in particular all the exemplary embodiments below are intended to demonstrate merely by way of example a few ways in which in particular such realizations of the teaching according to embodiments of the invention could be manifested.

Consequently, in particular the features of the individual exemplary embodiments are not restricted to the respective exemplary embodiment, but rather relate in particular to embodiments of the invention in general. Accordingly, features of one exemplary embodiment can also serve as features for another exemplary embodiment, in particular without this having to be explicitly stated in the respective exemplary embodiment.

FIG. 1 shows an exemplary embodiment of the present disclosure as a schematic diagram of a system 100 for writing and retrieval of data in a distributed ledger 108. In present implementation, the system 100 may reside on or may be executed by one or multiple computing devices 104, which may be connected to a network (e.g., the internet or a local area network), such as a network 106. Examples of computing devices 104 may include, but are not limited to, a personal computer(s), a laptop computer(s), mobile computing device(s), a server computer, a series of server computers, a mainframe computer(s), or a computing cloud(s). In general, the "computing device" in connection with embodiments of the present may be understood to mean for example a computer (system), a client, a smartphone, a device or a server that are in each case arranged outside the blockchain or are not participants in the distributed database (for example the blockchain) (that is to say do not perform operations with the distributed database or only query it without however performing transactions, inserting data blocks or calculating proof of work). As an alternative, the computing device may also in particular be understood to mean a node of the distributed database (as explained later in the description).

In certain implementations, the computing device 104 may be a physical or virtual device. In many implementations, the computing device 104 may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic.

In an example, the computing device 104 may be a computer-program product programmed for performing the purpose. In another example, the computing device 104 may be a computer readable medium on which program code sections of a computer program are saved, the program code sections being loadable into and/or executable in a system to make the system execute the steps for performing the purpose. The computing device 104 may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the computing device 104 can be implemented in a single chip. The system of the present disclosure as discussed in the preceding paragraphs may include or be embodied in the computing device 104. It may be appreciated that the two systems and (and the corresponding components/elements) may be equivalent for the purposes of the present disclosure.

In one embodiment, the computing device 104 includes a communication mechanism such as a bus for passing information among the components of the computing device 104. The computing device 104 includes one or more processing units and a memory unit. Generally, the memory unit is communicatively coupled to the one or more processing units. Hereinafter, the one or more processing units are simply referred to as processor and the memory unit is simply referred to as memory. Herein, in particular, the processor has connectivity to the bus to execute instructions and process information stored in the memory. The processor may include one or more processing cores with each core configured to perform independently. A multi-core processor enables multiprocessing within a single physical package. Examples of a multi-core processor include two, four, eight, or greater numbers of processing cores. Alternatively, or in addition, the processor may include one or more microprocessors configured in tandem via the bus to enable independent execution of instructions, pipelining, and multithreading. The processor may also be accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor. Similarly, an ASIC can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

As used herein, the term "processor" refers to a computational element that is operable to respond to and processes instructions that drive the system. Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processor" may refer to one or more individual processors, processing devices and various elements associated with a processing device that may be shared by other processing devices. Additionally, the one or more individual processors, processing devices and elements are arranged in various architectures for responding to and processing the instructions that drive the system.

The processor and accompanying components have connectivity to the memory via the bus. The memory includes both dynamic memory (e.g., RAM, magnetic disk, writable optical disk, etc.) and static memory (e.g., ROM, CD-ROM, etc.) for storing executable instructions that when executed perform the method steps described herein for writing and retrieval of data in a distributed ledger. In particular, the memory includes a module arrangement to perform steps for writing and retrieval of data in a distributed ledger. The memory also stores the data associated with or generated by the execution of the inventive steps.

Herein, the memory may be volatile memory and/or non-volatile memory. The memory may be coupled for communication with the processing unit. The processing unit may execute instructions and/or code stored in the memory. A variety of computer-readable storage media may be stored in and accessed from the memory. The memory may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like.

In some implementations, the instruction sets and subroutines of the system 100, which may be stored on storage device, such as storage device coupled to computer, may be executed by one or more processors and one or more memory architectures included within computer. In some implementations, one or more of storage devices may include but are not limited to: hard disk drives; flash drives, tape drives; optical drives; RAID arrays; random access memories (RAM); and read-only memories (ROM). Examples of user devices (and/or computer) may include, but are not limited to, a personal computer, a laptop computer, a smart/data-enabled, cellular phone, a notebook computer, a tablet, a server, a television, a smart television, a media capturing device, and a dedicated network device.

In some implementations, the computing device 104 may include a data store, such as a database (e.g., relational database, object-oriented database, triplestore database, etc.) and may be located within any suitable memory location, such as storage device coupled to computer. In some implementations, data, metadata, information, etc. described throughout the present disclosure may be stored in the data store. In some implementations, computer may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, the system 100 may be a component of the data store, a standalone application that interfaces with the above noted data store and/or an applet/application that is accessed via client applications. In some implementations, the above noted data store may be, in whole or in part, distributed in a cloud computing topology. In this way, computer and storage device may refer to multiple devices, which may also be distributed throughout the network 106.

In some implementations, the computing device 104 may execute an application for writing and retrieval of data in a distributed ledger, as described later in the description. In some implementations, the system 100 and/or application may be accessed via one or more of client applications. In some implementations, the system 100 may be a standalone application, or may be an applet/application/script/extension that may interact with and/or be executed within application a component of application and/or one or more of client applications. In some implementations, application may be a standalone application, or may be an applet/application/script/extension that may interact with and/or be executed within the system 100, a component of the system 100, and/or one or more of client applications. In some implementations, one or more of client applications may be a standalone application, or may be an applet/application/script/extension that may interact with and/or be executed within and/or be a component of the system 100 and/or application. Examples of client applications may include, but are not limited to, a standard and/or mobile web browser, an email application (e.g., an email client application), a textual and/or a graphical user interface, a customized web browser, a plugin, an Application Programming Interface (API), or a custom application. The instruction sets and subroutines of client applications which may be stored on storage devices coupled to user devices may be executed by one or more processors and one or more memory architectures incorporated into user devices.

In some implementations, one or more of client applications may be configured to effectuate some or all of the functionality of the system 100 (and vice versa). Accordingly, in some implementations, the system 100 may be a purely server-side application, a purely client-side application, or a hybrid server-side/client-side application that is cooperatively executed by one or more of client applications and/or the system 100.

In some implementations, one or more of client applications may be configured to effectuate some or all of the functionality of application (and vice versa). Accordingly, in some implementations, application may be a purely server-side application, a purely client-side application, or a hybrid server-side/client-side application that is cooperatively executed by one or more of client applications and/or application. As one or more of client applications the system 100, and application taken singly or in any combination, may effectuate some or all of the same functionality, any description of effectuating such functionality via one or more of client applications the system 100, application or combination thereof, and any described interaction(s) between one or more of client applications the system 100, application or combination thereof to effectuate such functionality, should be taken as an example only and not to limit the scope of the disclosure.

In some implementations, one or more of users may access the system 100 (e.g., using one or more of user devices) directly through the network 106. In some implementations, the network 106 may be connected to one or more secondary networks, examples of which may include but are not limited to: a local area network; a wide area network; or an intranet, for example. In some implementations, the computing device 104 may be connected to the network 106 through secondary network with phantom link line.

In some implementations, the various user devices may be directly or indirectly coupled to the network 106. For example, user device may be directly coupled to the network 106 via a hardwired network connection. Alternatively, user device may be wirelessly coupled to the network 106 via wireless communication channel established between user device and wireless access point (i.e., WAP) which in turn may be directly coupled to the network 106. WAP may be, for example, an IEEE 802.11a, 802.11b, 802.11g, 802.11ac, 802.11ae, Wi-Fi®, RFID, and/or Bluetooth™ (including Bluetooth™ Low Energy) device that is capable of establishing wireless communication channel between user device and WAP. In other examples, user device may be wirelessly coupled to the network 106 via wireless communication channel established between user device and cellular network/bridge which may be directly coupled to the network 106. User devices may execute an operating system, examples of which may include but are not limited to, Android®, Apple® iOS®, Mac® OS X®; Red Hat® Linux®, or a custom operating system.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example, Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

It is to be understood that the system and computer-assisted method described herein may be implemented in various forms of hardware, software, firmware, special purpose processors, or a combination thereof. "Computer-assisted" in connection with embodiments of the present disclosure may be understood to mean for example an implementation of the method in which in particular a processor executes at least one method step of the method. One or more of the present embodiments may take a form of a computer program product (non-transitory computer readable storage medium having instructions, which when executed by a processor, perform actions) comprising program modules accessible from computer-usable or computer-readable medium storing program code for use by or in connection with one or more computers, processors, or instruction execution system. A "module" in connection with embodiments of the invention may be understood to mean for example a processor and/or a storage unit for storing program commands. By way of example, the processor is specifically configured so as to execute the program commands such that the processor executes functions in order to implement or perform the method according to embodiments of the invention or a step of the method according to embodiments of the invention. For the purpose of this description, a computer-usable or computer-readable medium can be any apparatus that can contain, store, communicate, propagate, or transport the program for use by or in connection with the instruction execution system, apparatus, or device.

As illustrated in FIG. 1, the system 100 is implemented as an Internet-of-things (IoT) environment, in accordance with one or more embodiments of the present disclosure. In a particular embodiment, the system 100 may be implemented as an industrial Internet-of-things (IoT) environment. In such case, the system 100 may be associated with one or more industrial facilities. It may be noted that although the present disclosure has been described in terms of its implementation in the industrial IoT environment; in general, the present system 100 may be implemented in any IoT environment without any limitations. For the purpose of present disclosure, the terms "system", "IoT environment" and "industrial IoT environment" have been interchangeably used hereinafter. As described herein, the IoT environment 100, in particular, is a specific type of network having spatially distributed autonomous IoT devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions.

As illustrated, the system 100 includes a plurality of Internet of Things (IoT) devices 102a, 102b, . . . , 102n. The term "IoT device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device may have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet.

In some implementations, the industrial IoT environment 100 may comprise one or more automation systems operating within the respective industrial facilities. Exemplary automation systems can include, but are not limited to, batch control systems (e.g., mixing systems), continuous control systems (e.g., PID control systems), or discrete control systems. The industrial IoT environment 100 may also include devices such as industrial controllers (e.g., programmable logic controllers or other types of programmable automation controllers such as SCADA, DCS and the like); field devices such as sensors and meters; motor drives; operator interfaces (e.g., human-machine interfaces, industrial monitors, graphic terminals, message displays, etc.); industrial robots, barcode markers and readers; vision system devices (e.g., vision cameras); smart welders; or other such industrial devices. Exemplary automation systems may include one or more industrial controllers that facilitate monitoring and control of their respective processes. The industrial controllers exchange data with the field devices using native hardwired I/O or via a plant network such as Ethernet/IP, Data Highway Plus, ControlNet, Devicenet, or the like. A given industrial controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The industrial controller then outputs appropriate digital and/or analog control signalling to the field devices in accordance with the decisions made by the control program. These outputs can include device actuation signals, temperature or position control signals, operational commands to a machining or material handling robot, mixer control signals, motion control signals, and the like.

In some implementations, the IoT environment 100 may be configured for data acquisition, packaging, and transmission of industrial data generated by the IoT devices 102a, 102b, . . . , 102n. The IoT environment 100 acts as a generic gateway to collect data items from the various IoT devices 102a, 102b, . . . , 102n of one or more industrial facilities, and packages the collected data according to a generic, uniform data packaging scheme used to move the on-premise data for storage and processing. In particular, the data from the IoT devices 102a, 102b, . . . , 102n is provided to the computing device 104 (such as, cloud computing server) over the network 106. For this purpose, each of the IoT devices 102a, 102b, . . . , 102n (node) in the IoT environment 100 may generally be equipped with a radio transceiver or other communication port such as PLC, a microcontroller, and an energy source, such as a battery. Often, the IoT environment employs field area networks (FANs), neighborhood area networks (NANs), etc.

It may be appreciated that in the IoT environment 100, each of the IoT devices 102a, 102b, . . . , 102n may act as a node. A "node", "node of a distributed database", "blockchain node" and the like in connection with embodiments of the present disclosure may be understood to mean for example devices (for example field devices), sensors, computers, smartphones, clients or participants that perform operations with/of the distributed database (as discussed hereinafter). Such nodes may for example execute transactions of a distributed database or its data blocks or insert or chain new data blocks containing new transactions into the distributed database by way of new data blocks.

Further, as illustrated, the system 100 includes a distributed ledger 108. A "distributed ledger", also referred to as "distributed database" in connection with embodiments of the present disclosure may be understood to mean for example a database distributed in a decentralized manner, a blockchain or a peer-to-peer database. In present implementations, the distributed ledger 108 is a blockchain system. If for example a blockchain is used, then the distributed ledger 108 may in particular be implemented by way of a Bitcoin-based implementation or an Ethereum-based implementation, as known in the art. Blockchain is a decentralized ledger for recording transactions between two or more clients participating in the blockchain's peer-to-peer network. Transactions are recorded in chunks referred to as blocks, and the chain of blocks, with each pointing to an ancestor, constitutes the blockchain.

A "distributed ledger system", which may also be referred to for example as a distributed database system, in connection with embodiments of the present disclosure may also be understood to mean for example a database distributed in a decentralized manner, a blockchain, a distributed ledger, a distributed storage system, a distributed ledger technology (DLT)-based system (DLTS), a revision-proof database system, a cloud, a cloud service, a blockchain in a cloud or a peer-to-peer database. Different implementations of a blockchain or of a DLTS may also for example be used, such as for example a blockchain or a DLTS that is implemented by way of a directed acyclic graph (DAG), a hash graph or a combination of the implementation variants. Different consensus methods (consensus algorithms) may also for example be implemented. This may be for example a consensus method using a cryptographic puzzle, gossip about gossip, virtual voting or a combination of the methods (for example gossip about gossip in combination with virtual voting).

As shown, the distributed ledger 108 may include multiple copies of ledger, such as ledgers 108a, 108b, . . . , 108n. Each of the ledgers 108a, 108b, . . . , 108n may be implemented in a separate computing node. The distributed ledger 108 may also be understood to mean for example a distributed database system, at least some of the nodes and/or devices and/or infrastructure of which are implemented by a cloud. By way of example, the corresponding components may be implemented in the form of nodes/devices in the cloud (for example in the form of virtual nodes in a virtual machine). This may be achieved for example using VM-ware, Amazon Web Services or Microsoft Azure. Due to the high flexibility of the explained implementation variants, partial aspects of the implementation variants may also in particular be combined with one another, for example by using a hash graph as a blockchain, wherein the blockchain itself may also for example be block-less.

The distributed database system may be for example a public distributed database system (for example a public blockchain) or a closed (or private) distributed database system (for example a private blockchain). If it is for example a public distributed database system, this means that new nodes and/or devices are able to join or be accepted by the distributed database system without proof of authorization or without authentication or without registration information or without credentials. In such a case, the operators of the nodes and/or devices may in particular remain anonymous. If the distributed database system is for example a closed distributed database system, new nodes and/or devices for example require a valid proof of authorization and/or valid authentication information and/or valid credentials and/or valid registration information in order to be able to join or be accepted by the distributed database system. A distributed database system may also for example be a distributed communication system for exchanging data. This may for example be a network or a peer-2-peer network.

"Data block", which may in particular also be referred to as "block" depending on context and implementation, in connection with embodiments of the present disclosure may be understood to mean for example a data block of a distributed database (for example a blockchain or a peer-to-peer database) that is implemented in particular in the form of a data structure and in each case comprises one of the transactions or a plurality of the transactions. In one implementation, the database may for example be a blockchain and a data block may be a block of the blockchain. A data block may for example contain specifications about the size (data size in bytes) of the data block, a data block header, a transaction counter and one or more transactions. The data block header may for example contain a version, a chaining checksum, a data block checksum, a timestamp, proof of work and a nonce (one-time value, random value or counter used for the proof of work).

"Preceding data blocks of a (particular) data block of the distributed database" in connection with embodiments of the present disclosure may be understood to mean for example only that data block of the distributed database that in particular directly precedes a (particular) data block. As an alternative, "preceding data blocks of a (particular) data block of the distributed database" may in particular also be understood to mean all of the data blocks of the distributed database that precede the particular data block. As a result, the chaining checksum or the transaction checksum may in particular for example be formed only from the data block (or its transactions) directly preceding the particular data block or from all of the data blocks (or their transactions) preceding the first data block.

FIG. 2 illustrates an exemplary embodiment of the present disclosure as a flowchart for a method 200 for writing and retrieval of data in a distributed ledger (such as, the distributed ledger 108 of FIG. 1). As discussed, the traditional blockchain framework does not support transactions made by offline nodes unless they come online and propose new transactions, as this is by design that the transactions proposed by the offline nodes are discarded by the consortia at a protocol level. The present method 200 provides the ability to offline nodes to commit transactional data to the blockchain, while maintaining the same temporal view as would have been the case if they were online. The present method 200 presents a methodology wherein the relationship between time and data is maintained. This is more relevant for industrial use cases wherein blockchain is regarded as an immutable data store rather than a cryptocurrency.

It may be understood that blockchain is a chronological database as it records data in form of chained or ordered blocks and each block corresponds to the data or transactions in a specific logical or real time epoch. For example, if a block is produced every 10 minutes and the genesis (first) block was created at 1 am, the second block will depict the time 1:00-1:10, and so on. If all the nodes are online, this data is recorded in a timely manner. However, if one or more of the nodes are offline, they will not be able to interact with the main blockchain and the data can only be recorded after they come back online.

The present method 200 proposes to use side chains to record such data which was not recorded on time. Side chains are secondary blockchains, that steer along a main chain like Bitcoin, Ethereum etc. They are chains pegged to the main chain which enables reading data, interpreting data from main chain and the exchange of asset from main chain to side chain and back. Typically, side chains are pegged or unpegged at the current block (i.e., in the present) and can be scheduled for a later block (i.e., in the future). However, in the embodiments of the present disclosure, the method 200 proposes to peg side chains between blocks which have already been committed, thereby providing an alternate chain to store data which would otherwise have been recorded out of order. The steps involved in implementing the present method 200 (as depicted in FIG. 2) have been discussed in reference to FIGS. 3A and 3B in detail hereinafter.

Figure 3A:
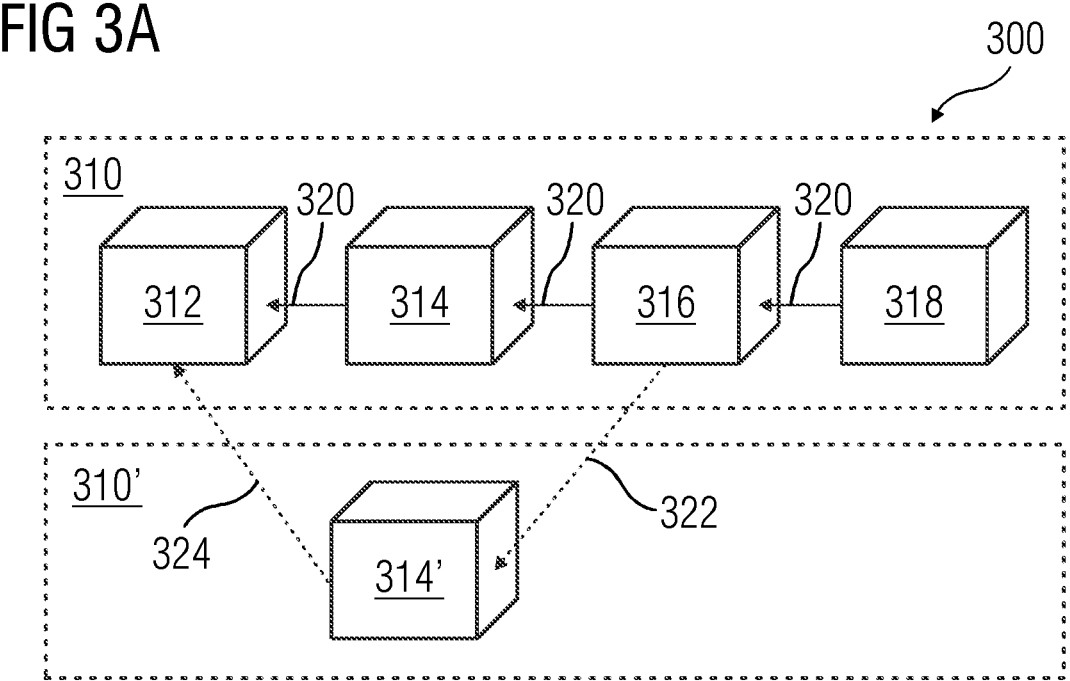
FIG. 3A is a schematic diagram representation of the distributed ledger, in accordance with an embodiment of the present disclosure.

At step 202, the method 200 includes receiving a first dataset comprising data entries between a start instant of a current regular time interval and an end instant of the current regular time interval, from nodes that are online at the end instant of the current regular time interval. Referring to FIG. 3A, a distributed ledger 300 is depicted as formed by implementation of the present method 200. The distributed ledger 300 is adapted to commit blocks therein at regular time intervals. As shown, the distributed ledger 300 includes a main chain 310. Further, as shown, the main chain 310 includes a plurality of main blocks. Herein, the main chain grows as usual; that is, each new main block is added to the main chain 310 at the defined regular time intervals. So, at end instant of first regular time interval, the first main block (represented as block 312) would have been added. Further, the data entries between a start instant of the first regular time interval and an end instant of the first regular time interval are added to the first main block 312, from nodes that were online at the end instant of the first regular time interval.

For instance, assuming that the defined regular time interval for the distributed ledger 300 is 10 minutes, and the first block was to be added at 03:00 Hours, and also assuming that all nodes (i.e., all the IoT devices 102a, 102b, . . . , 102n) were online at 03:00 Hours, then data entries from all nodes would have been received at 03:00 Hours, and all such received data entries would have been recorded in the first main block 312. Also, it may be appreciated that 03:00 Hours would be considered as a start instant of next regular time interval for the distributed ledger 300. Now, considering current time being 03:10 Hours. This may be considered an end instant of a current regular time interval (with 10 minutes being passed from 03:00 Hours), with the start instant of the current regular time interval being 03:00 Hours. Herein, the first dataset (not shown) includes data entries generated by one or more of the IoT devices 102a, 102b, . . . , 102n that are online at the current time (i.e., 03:10 Hours); and the first dataset is received at the end instant of the current regular time interval (i.e., 03:10 Hours).

At step 204, the method 200 includes recording the received first dataset in a current main block. That is, the first dataset as received at the end instant of the current regular time interval (i.e., 03:10 Hours) is recorded in a subsequent block to the first main block, i.e., a second main block (as represented by a block 314) in the main chain 310. Such process of generating the block and recording the data entries therein is well known in the art and thus has not been explained for the brevity of the present disclosure. Also, it may be noted that during the creation of the second main block 314, some nodes (i.e., other of the one or more of the IoT devices 102a, 102b, . . . , 102n) were offline and hence, the data entries generated by such nodes between 03:00 Hours and 03:10 Hours may not have been recorded.

At step 206, the method 200 includes receiving one or more second datasets comprising data entries between respective start instants of corresponding one or more given regular time intervals, preceding the current regular time interval, and respective end instants of the corresponding one or more given regular time intervals, from nodes that were offline at the respective end instants of the corresponding one or more given regular time intervals and are online at the end instant of the current regular time interval. As discussed in the above example, during the creation of the second main block 314, some nodes were offline and hence, and corresponding data entries were not received and recorded. Later, say at 03:20 Hours, when a third main block (as represented by block 316) is to be created and added to the main chain 310, considering that those offline nodes came back online. In such case, the data entries generated by such nodes during the last regular time interval, i.e., the time interval between 03:00 Hours and 03:10 Hours (which is preceding the current time interval, i.e., the time interval between 03:10 Hours and 03:20 Hours) are considered as part of the second dataset. This second dataset is received at the end instant of the current regular time interval (i.e., 03:20 Hours).

At step 208, the method 200 includes recording each of the received one or more second datasets in corresponding one or more current temporal side blocks. In the present example, as discussed, the second dataset is received at the end instant of the current regular time interval (i.e., 03:20 Hours). Herein the second dataset is recorded in a side chain 310', which is different than and complementary to the main chain 310. Specifically, the second dataset is recorded in a temporal side block; in this case, a first temporal side block (represented by a block 314') in the side chain 310'. As mentioned earlier, the side chains are secondary blockchains, that steer along the main chain, and are pegged to the main chain which enables reading data, interpreting data from the main chain and the exchange of asset from the main chain to the side chain and back. Further, as discussed earlier, the first dataset corresponding to the current time interval, i.e., the time interval between 03:10 Hours and 03:20 Hours would also be received at the end instant of the current regular time interval (i.e., 03:20 Hours). This first dataset is recorded in a third main block (represented by a block 316) in the main chain 310. Thus, at the end instant of the current regular time interval (i.e., 03:20 Hours), two blocks, including the third main block 316 in the main chain 310 and the first temporal side block 314' in the side chain 310' are created, with the first temporal side block 314' in the side chain 310' holding the missing data entries corresponding to the regular time interval of the second main block 314 of the main chain 310.

At step 210, the method 200 includes pegging the one or more current temporal side blocks to the current main block. Herein, as illustrated in FIG. 3A, since the first temporal side block 314' is created along with some block on the main chain 310 (i.e., the third main block 316 of the main chain 310 in the current scenario), the consensus of both the blocks 314' and 316 can be clubbed together. This ensures that the block is validated properly.

In some implementations, a process pegging the one or more current temporal side blocks to the current main block includes creating a second link connecting the current main block to a last one of the one or more current temporal side blocks. That is, a second link 322 is created between the last main block created in the main chain 310 and a last generated temporal side block in the side chain 310'. In the present example of FIG. 3A, the second link 322 is created between the third main block 316 in the main chain 310, and the first temporal side block 314' in the side chain 310'. Further, the process includes creating a third link connecting first one of the one or more current temporal side blocks to one of the main blocks corresponding to a given regular time interval preceding another given regular time interval corresponding to the first one of the one or more current temporal side blocks. That is, a third link 324 is created between the first of the temporal side blocks generated in the side chain 310' and a main block in the main chain 310 created at end instant of the time interval preceding the time interval when the first of the temporal side blocks generated in the side chain 310' was generated. In the present example of FIG. 3A, the third link 324 is created between the first temporal side block 314' in the side chain 310' and the first main block 312 in the main chain 310.

At step 212, the method 200 includes committing the current main block to the distributed ledger. As discussed, the created main blocks with the data entries recorded therein are committed to the main chain 310. This results in immutable record of data entries in the distributed ledger 300. In the present implementations, committing the current main block to the distributed ledger comprises creating a first link connecting the current main block to a previously committed main block in a main chain of the distributed ledger. In the present example of FIG. 3A, when the data entries from the corresponding first dataset have been recorded in the second main block 314 of the main chain 310, the second main block 314 is committed to the main chain 310, and thereby the distributed ledger 300. This is achieved by creating a first link 320 connecting the second main block 314 (which is the current main block) to the first main block 312 (which is the previously committed main block) in the main chain 310 of the distributed ledger 300. Similarly, the third main block 316 is committed to the main chain 310 by creating another first link 320 between the third main block 316 and the second main block 316, in the main chain 310. Further, in the present example, considering that all the nodes are online at the end instant of the regular time interval proceeding creation of the third main block 316, a fourth main block (represented by a block 318) is created as usual and committed to the third main block 316 in the main chain 310 of the distributed ledger 300.

It may be appreciated that as multiple nodes (peers) can update the state of the same asset, one or more transactions in the temporal side block in the side chain 310' might not be valid anymore due to some related transactions in the foreminding main block in the main chain 310. For this purpose, the method 200 includes discarding data entries associated with one of the given regular time intervals from the one or more second datasets conflicting with data entries recorded in one of the main blocks corresponding to the one of the given regular time intervals and committed to the distributed ledger. That is, in such a case, only the data entries (like transactions) in the second dataset which are conflicting (like matching/duplicate transactions) with data entries in the first dataset of the corresponding time interval are discarded and not recorded in the corresponding temporal side block. In the present example of FIG. 3A, if there are data entries to be recorded in the first temporal side block 314' in the side chain 310' which are conflicting with the data entries in the corresponding second main block 314 in the main chain 310, then those conflicting data entries are discarded and not recorded in the first temporal side block 314'. As may be understood, this can be easily done since the nodes are providing data entries to the third main block 316 of the main chain 310 and know the state for the data entries in the second main block 314. Thus, the source nodes are notified and the first temporal side block 314' and the third main block 316 are committed only with the valid transactions.

The above example explained scenario for when one or more nodes may go offline for one instance of the end of a given regular time interval defined for the distributed ledger 300. In such case, two links (i.e., the second links 322 and the third links 324) are created, with the second link 322 connecting the current main block to a last one of the one or more current temporal side blocks and the third link 324 connecting first one of the one or more current temporal side blocks to one of the main blocks corresponding to a given regular time interval preceding another given regular time interval corresponding to the first one of the one or more current temporal side blocks. For the current scenario, it is straightforward since the temporal side block in the side chain 310' is created along with the very next main block in the main chain 310.

Figure 3B:
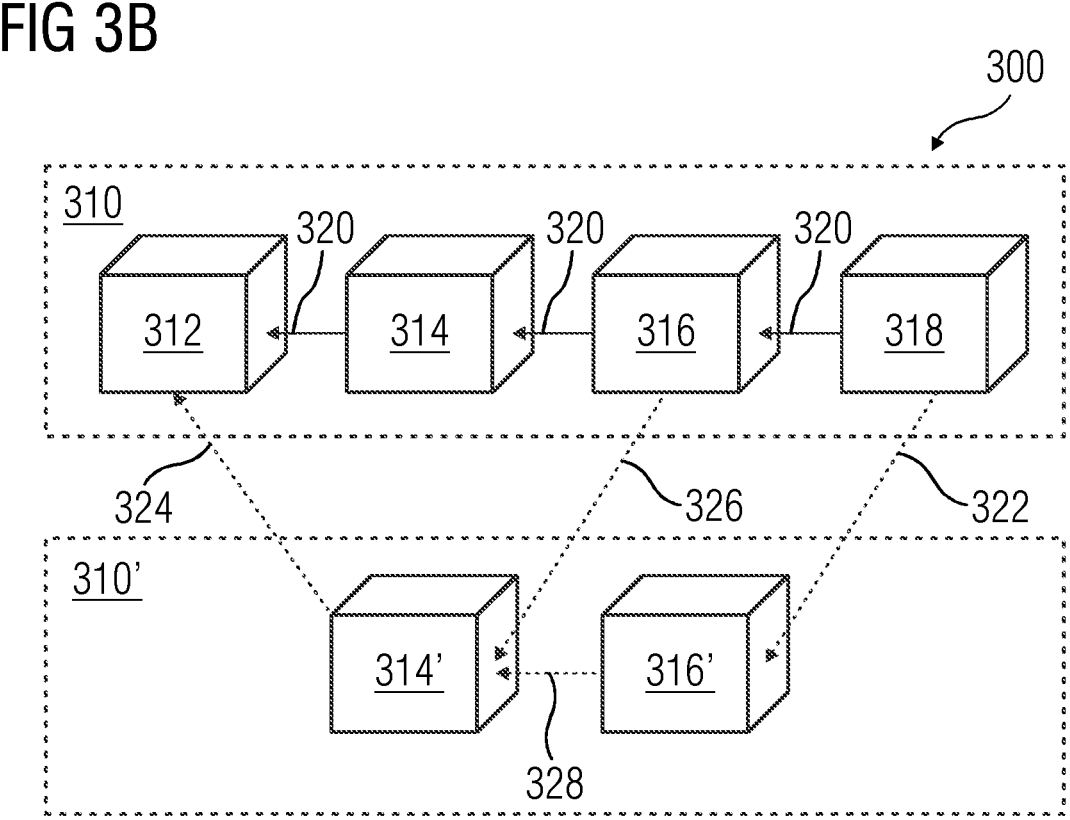
FIG. 3B is a schematic block representation illustration of the distributed ledger, in accordance with another embodiment of the present disclosure.

However, if the nodes are offline for a longer period, that is more than one instance of the end of a given regular time interval defined for the distributed ledger 300; in such case, it may be understood that multiple main blocks the main chain 310 may have been created and committed in that time. FIG. 3B illustrates another implementation of the distributed ledger 300 for resolving the issue, in accordance with one or more embodiments of the present disclosure. As depicted in FIG. 3B, in the current case, the nodes are offline and, in the meantime, the main blocks 314 and 316 have been created in the main chain 310. When such nodes come back online, the main block 318 is created as usual. In the embodiments of the present disclosure, the first temporal side block 314' is created for recording data entries from nodes that were previously offline at end instant of the last regular time interval (i.e., 03:10 Hours) and came back online at the end instant of the next regular time interval (i.e., 03:20 Hours). Further, a second temporal side block 316' is created for recording data entries from nodes that were even offline at 03:20 Hours and came back online at least at the end instant of the further regular time interval (i.e., 03:30 Hours); in addition to the data entries for the nodes that may have been online at 03:10 Hours but were offline at 03:20 Hours, and came back online at 03:30 Hours.

In such implementation of the present disclosure, the method 200 further includes creating one or more fourth links, with each of the one or more fourth links connecting one of committed main blocks in the main chain of the distributed ledger if available to one of the temporal side blocks corresponding to a given regular time interval preceding another given regular time interval corresponding to the one of the committed main block. Herein, it may be understood that the second link 322 from the fourth main block 318 in the main chain 310 to the second temporal side block 316' in the side chain 310' can be created, but the link from the third main block 316 in the main chain 310 to the first temporal side block 314' in the side chain 310' cannot be created, since the third main block 316 has already been committed to the main chain 310. However, such link is required because if in response to a query regarding the data in the second main block 314, the querier starts from the third main block 316 (like query for data entries for the time interval between 03:00 Hours to 03:20 Hours, in the present example), instead of starting from the fourth main block 318 or later, the recorded data entries in the first temporal side block 314' is likely to be missed in the response to such query. In the present implementation, as illustrated in FIG. 3B, the fourth link 326 is created between the third main block 316 in the main chain 310 to the first temporal side block 314' in the side chain 310'. This fourth link 326 needs to be maintained outside the committed block. For this purpose, an additional field is created in each block which can hold the hash of corresponding side chain block. This field is populated when the fourth main block 318 is created (and the second temporal side block 316' along with it).

In some implementations, the method 200 further includes creating one or more fifth links connecting the one or more current temporal side blocks to form a side chain in the distributed ledger. As shown in FIG. 3B, the side chain 310' includes a fifth link 328 formed between the first temporal side block 314' and the second temporal side block 316'. This fifth link 328 may help with traversal of the side chain 310', but may not be mandatorily required, as the temporal side blocks in the side chain 310' can be pegged individually to the main blocks in the main chain 310 without necessarily having any links therebetween.

In the method 200 of the present disclosure, retrieving data associated with a particular regular time interval from the distributed ledger comprises reading data entries from the committed main block in the main chain corresponding to the particular regular time and data entries from a temporal side block pegged to another committed main block next to the committed main block in the main chain. As there might be some forks in the chain, single-path traversal is not feasible. In case of no side chain, i.e., when all the nodes were at least online at end of each of the regular time intervals for the distributed ledger to provide data transmission, there might not be need of the side chain as all data entries would be recorded in the main chain, and thus there exists a single link in the main chain, which can be traversed for data retrieval. In case of the distributed ledger 300 as shown in FIG. 3A, the second main block 314 and the corresponding first temporal side block 314' are treated as a single block while reverse traversal of the main chain 310 and the data entries from the two blocks 314 and 314' are aggregated. In case of the distributed ledger 300 as shown in FIG. 3B, there can be one or two links, but a parallel second temporal side block 316' exists. Herein, the resolution is performed at the fourth main block 318 itself as described above; and correspondingly, the data entries from the third main block 316 and the second main block 314 in the main chain 310, and the data entries from the second temporal side block 316' and the first temporal side block 314' are aggregated.

Thereby, the present system 100 and the method 200 provide the distributed ledger 300 which allows for recording datasets from offline nodes to be written therein and later retrieved therefrom. Existing blockchain technologies expect nodes to be always online and discard the transactions when an offline node comes up online. This is based on the rule of "longest chain" where the longest chain is considered the main chain. The present disclosure improves upon this by allowing such transactions to be recorded in the same temporal space while still being validated. This improves fault tolerance of the blockchain applications. Further, it allows addition of data even if a node is offline for certain time or blocks. This further enables better performance of the IoT blockchain use cases by handling transactions created during poor network connection.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for writing and retrieval of data in a distributed ledger configured to commit blocks therein at regular time intervals, wherein each block corresponds to data or transactions in a specific logical or real time epoch, the method comprising the steps of, carried out by a same computing device that is a node of the distributed ledger:
- receiving a first dataset comprising data entries between a start instant of a current regular time interval and an end instant of the current regular time interval, from nodes that are online at the end instant of the current regular time interval;
- recording the received first dataset in a current main block;
- receiving one or more second datasets comprising data entries between respective start instants of corresponding one or more given regular time intervals, preceding the current regular time interval, and respective end instants of the corresponding one or more given regular time intervals, from nodes that were offline at the respective end instants of the corresponding one or more given regular time intervals and are online at the end instant of the current regular time interval, wherein the first dataset and the one or more second datasets each comprise data entries collected from IoT devices of one and more industrial facilities for recording in the blocks of the distributed ledger;
- recording each of the received one or more second datasets in corresponding one or more current temporal side blocks;
- pegging the one or more current temporal side blocks to the current main block; and
- committing the current main block to the distributed ledger.

2. The method according to claim 1, wherein committing the current main block to the distributed ledger comprises creating a first link connecting the current main block to a previously committed main block in a main chain of the distributed ledger.

3. The method according to claim 1, wherein pegging the one or more current temporal side blocks to the current main block comprises:
- creating a second link connecting the current main block to a last one of the one or more current temporal side blocks; and
- creating a third link connecting first one of the one or more current temporal side blocks to one of the main blocks corresponding to a given regular time interval preceding another given regular time interval corresponding to the first one of the one or more current temporal side blocks.

4. The method according to claim 3 further comprising creating one or more fourth links, with each of the one or more fourth links connecting one of committed main block in the main chain of the distributed ledger if available to one of the temporal side blocks corresponding to a given regular time interval preceding another given regular time interval corresponding to the one of the committed main block.

5. The method according to claim 1, wherein retrieving data associated with a particular regular time interval from the distributed ledger comprises reading data entries from the committed main block in the main chain corresponding to the regular time and data entries from a temporal side block pegged to another committed main block next to the committed main block in the main chain.

6. The method according to claim 1 further comprising discarding data entries associated with one of the given regular time intervals from the one or more second datasets conflicting with data entries recorded in one of the main blocks corresponding to the one of the given regular time interval and committed to the distributed ledger.

7. A system for writing and retrieval of data in a distributed ledger configured to commit blocks therein at regular time intervals, the system comprising:
- one or more processing units; and
- a memory communicatively coupled to the one or more processing units, the memory comprising a module stored in the form of machine-readable instructions executable by the one or more processing units, wherein the module is configured to perform the method steps according to claim 1.

8. The system according to claim 7, wherein the distributed ledger is implemented in an internet-of-things environment.

9. A computer-program product, having non-transitory computer-readable instructions stored therein, that when executed by a processor, cause the processor to perform method steps according to claim 1.

10. A non-transitory computer readable medium on which program code sections of a computer program are saved, the program code sections being loadable into and/or executable in a system to make the system execute the method steps according to claim 1 when the program code sections are executed in the system.

11. The method according to claim 1, wherein the IoT devices were offline and unable to interact with the distributed ledger at the respective end instants of the corresponding one or more given regular time intervals and are online and able to interact with the distributed ledger at the end instant of the current regular time interval.

* * * * *